US006859824B1

(12) United States Patent
Yamamoto et al.

(10) Patent No.: US 6,859,824 B1
(45) Date of Patent: Feb. 22, 2005

(54) STORAGE SYSTEM CONNECTED TO A DATA NETWORK WITH DATA INTEGRITY

(75) Inventors: Akira Yamamoto, Cupertino, CA (US); Kenji Yamagami, Los Gatos, CA (US)

(73) Assignee: Hitachi, Ltd., Tokyo (JP)

( * ) Notice: Subject to any disclaimer, the term of this patent is extended or adjusted under 35 U.S.C. 154(b) by 770 days.

(21) Appl. No.: 09/607,807

(22) Filed: Jun. 30, 2000

(51) Int. Cl.[7] .............................................. G06F 15/16
(52) U.S. Cl. ...................................... 709/217; 370/468
(58) Field of Search ................................. 709/217, 206, 709/237, 315; 370/394, 468, 473; 714/6, 15, 18; 707/204

(56) References Cited

U.S. PATENT DOCUMENTS

| | | | |
|---|---|---|---|
| 5,544,347 A | | 8/1996 | Yanai et al. |
| 5,870,537 A | | 2/1999 | Kern et al. |
| 6,301,643 B1 | * | 10/2001 | Crockett et al. ............ 711/162 |
| 6,324,654 B1 | * | 11/2001 | Wahl et al. ..................... 714/6 |
| 6,446,175 B1 | * | 9/2002 | West et al. ................. 711/162 |
| 6,526,419 B1 | * | 2/2003 | Burton et al. ............... 707/204 |
| 6,594,786 B1 | * | 7/2003 | Connelly et al. ............. 714/50 |
| 6,629,264 B1 | * | 9/2003 | Sicola et al. .................. 714/15 |
| 6,662,213 B1 | * | 12/2003 | Xie et al. .................... 709/206 |

FOREIGN PATENT DOCUMENTS

| | | |
|---|---|---|
| EP | 0671686 A1 | 9/1995 |
| JP | 11-85408 | 3/1999 |

OTHER PUBLICATIONS

Schulzrinne, H. et al., "Network Working Group, Request for Comments: 1889", Jan. 1996, PP 1–75.*

* cited by examiner

Primary Examiner—Marc D. Thompson
(74) Attorney, Agent, or Firm—Townsend and Townsend and Crew LLP

(57) ABSTRACT

A storage system includes a local storage component coupled to a remote storage component over a communication network. The communication network is characterized by its inability to guarantee receipt of data packets in the same order the data packets are sent. A method in accordance with the invention ensures the proper ordering of handling received requests despite the nature of the communication network.

20 Claims, 12 Drawing Sheets

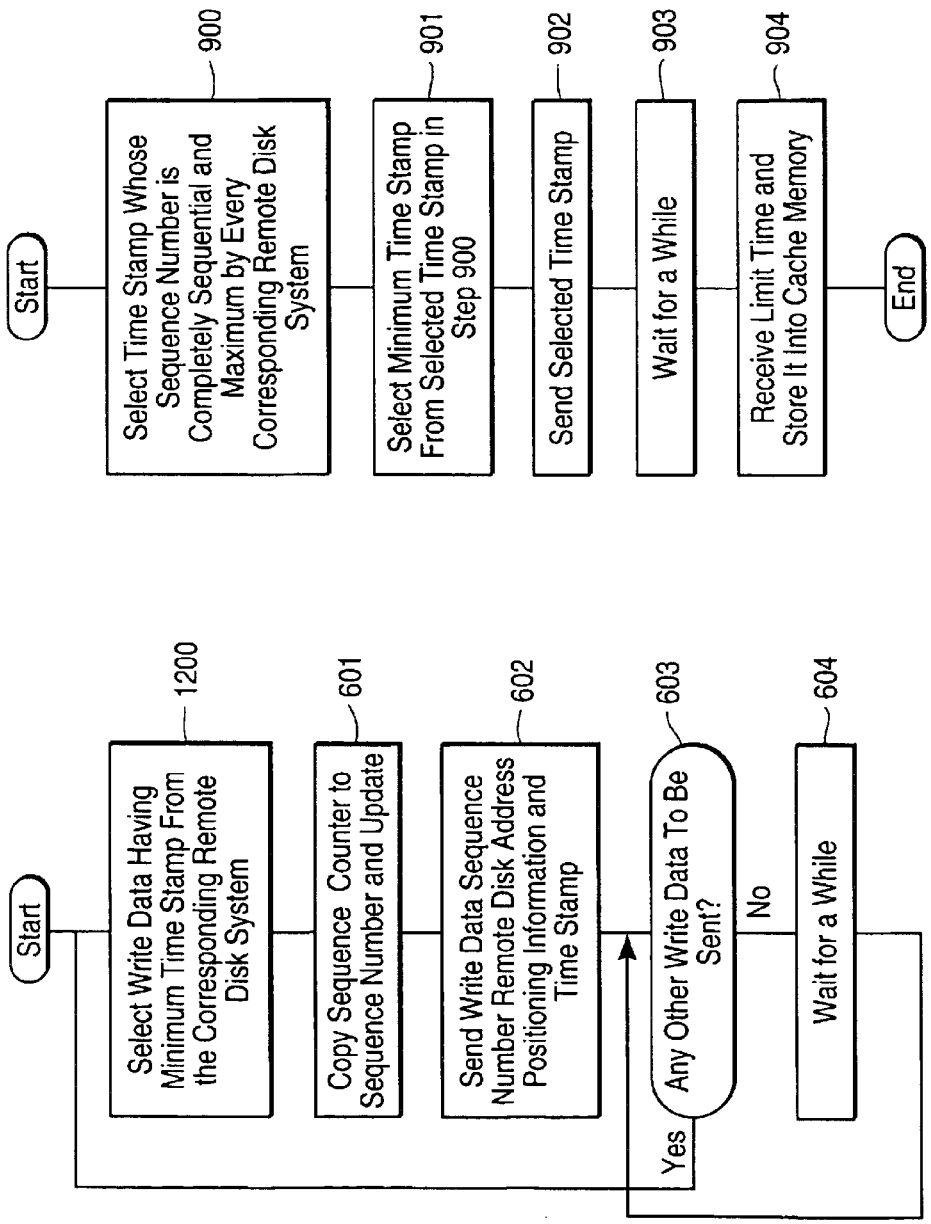

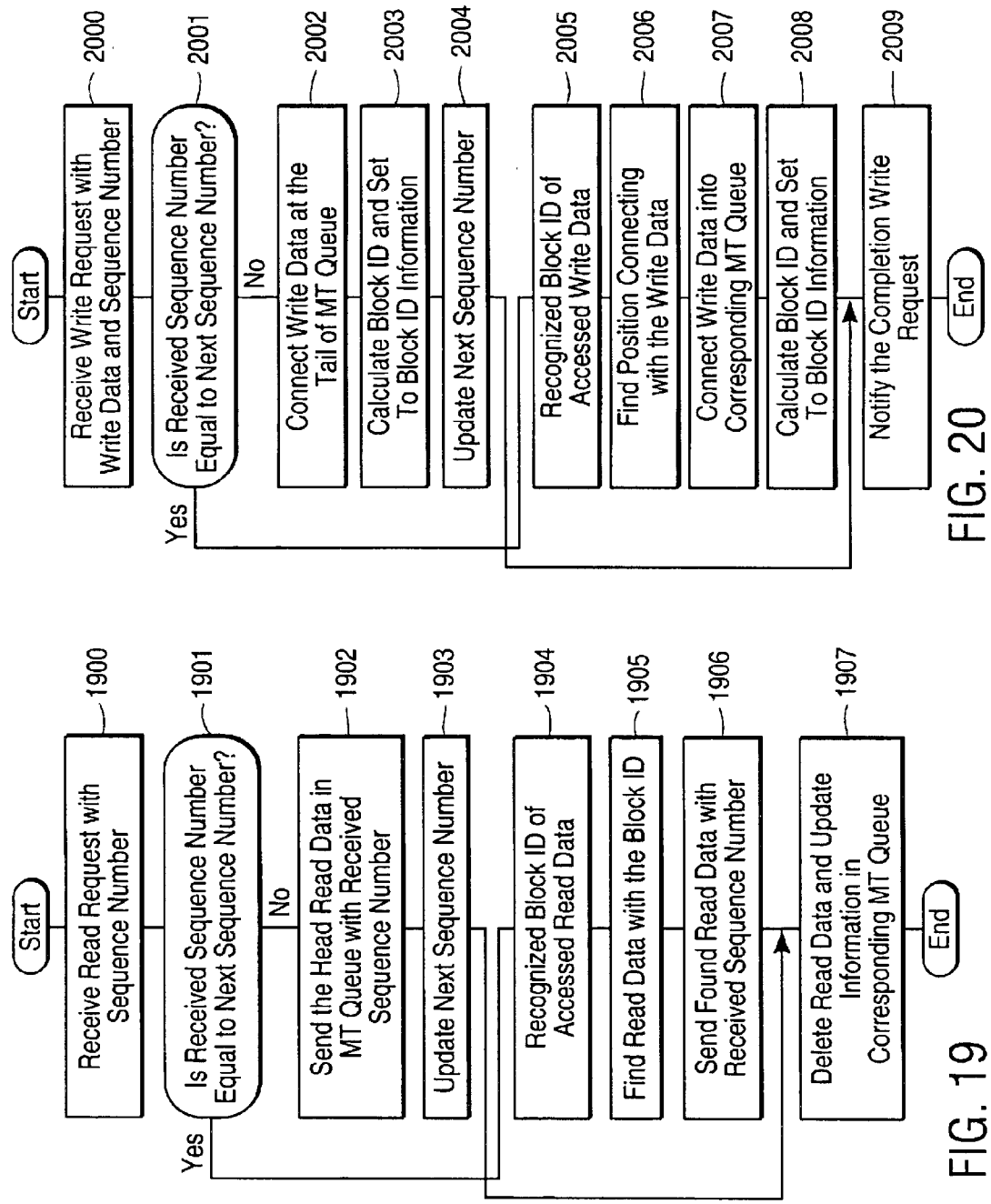

STORAGE SYSTEM CONNECTED TO A DATA NETWORK WITH DATA INTEGRITY

BACKGROUND OF THE INVENTION

The present invention relates generally to data storage systems and more particularly to maintaining data integrity of data storage systems in a data network environment.

Conventionally, data processing systems have access to their associated data storage systems over a high speed, high reliability data bus. However, opportunities become available as the widespread use of network communications continues to expand. IP (Internet Protocol) provides the basic packet delivery service on which TCP/IP (transport control protocol/IP) networks are built. IP is a well defined protocol and is therefore a natural candidate for providing the transport/networking layer for network-based data storage access, where server systems exchange data with storage systems and storage systems exchange data with other storage systems using IP.

The nature of IP, however, presents some unique problems in the area of data storage access systems. First, IP is a connectionless protocol. This means that IP does not exchange control information to establish an end-to-end connection prior to transmitting data. IP contains no error detection and recovery mechanism. Thus, while IP can be relied on to deliver data to a connected network, there is no mechanism to ensure the data was correctly received or that the data is received in the order that it was sent. IP relies on higher layer protocols to establish the connection if connection-oriented service is desired.

In a data storage system where dual remote copy capability is needed, IP-based transmission presents a problem. A remote copy function provides a real time copy of a primary data store at a remote site with the goal of realizing disaster recovery in the primary data store. It is important to guarantee data integrity in order that this function serves its purpose. There are two types of remote copy: synchronous and asynchronous.

In a synchronous type remote copy, a write request by a local HOST to its associated local disk system does not complete until after the written data is transferred from the local disk system to a remote disk system. Thus, in the case of synchronous type copy, it is easy to ensure data integrity between the local and the remote disk system.

In an asynchronous type remote copy, a write request by the local HOST completes before the local disk completes its transfer to the remote disk. As the name implies, control is returned to the local HOST irrespective of whether the transfer operation from the local disk to the remote disk completes. Data integrity during an asynchronous type copy operation, therefore, relies on a correct arrival order of data at the remote disk system so that data on the remote disk is written in the same order as on the local disk.

To achieve this, the local disk system includes a time stamp with the data that is sent to the remote disk. Data at the remote is written according to the order of the time stamp. Thus, for example, when the remote disk receives data with a time stamp 7:00, it has already received all data whose time stamps precede 7:00.

However, in an IP-based network, when packets can arrive out of sequence, a data packet having a time stamp of 7:00 may or may not be preceded by data packets having an earlier time stamp. Consequently, it is difficult to ensure data integrity at a remote disk system when the transmission protocol is based on connectionless transport model such as the IP.

Another problem arises when IP is used with magnetic tape systems. Read and write operations to magnetic tape is sequential and so the addressing is fixed. Thus, in the case where a data packet arrives at the remote site out of sequence, the data will be written to tape in incorrect order. A subsequent recovery operation from tape to restore a crashed storage system would result in corrupted data.

There is a need to provide a reliable IP-based data recovery system.

SUMMARY OF THE INVENTION

A data storage system in accordance with the invention comprises a local storage component and a remote storage component. Data to be written to the local storage component is sent in a data packet to the remote storage component over a data network.

The data packet includes a copy of the data to be written at the local storage component, a time stamp, and a sequence number. Plural such data packets are received at the remote storage component. The data packets are selected for writing at the remote storage component based on the sequence numbers and the time stamps associated with each data packet.

In one embodiment of the invention, the local and remote storage components are configured as plural local and remote disk units, respectively. Each local disk unit is associated with a remote disk unit. Each such pairing is called a remote copy pair. In this embodiment, each remote copy unit has an associated sequence number.

In another embodiment of the invention, the local disk units are grouped into local disk systems. Similarly, each remote disk unit is grouped into remote disk systems. In this embodiment of the invention, there is a sequence number for each pair of local and remote disk systems which have at least one common remote copy pair.

In another embodiment of the invention, the remote copy pairs are grouped into data integrity pair groups. In this embodiment, there is a sequence number for each pair of local and remote disk systems which have in common at least one data integrity pair group.

BRIEF DESCRIPTION OF THE DRAWINGS

The teachings of the present invention can be readily understood by considering the accompanying detailed description in conjunction with the following drawings:

FIG. 12 shows an alternate embodiment of the process flow shown in FIG. 6;

FIG. 13 shows an alternate embodiment of the process flow shown in FIG. 9;

FIGS. 17–20 show process flows in an embodiment of the invention in a magnetic tape storage system.

DESCRIPTION OF THE SPECIFIC EMBODIMENTS

Figure 1:
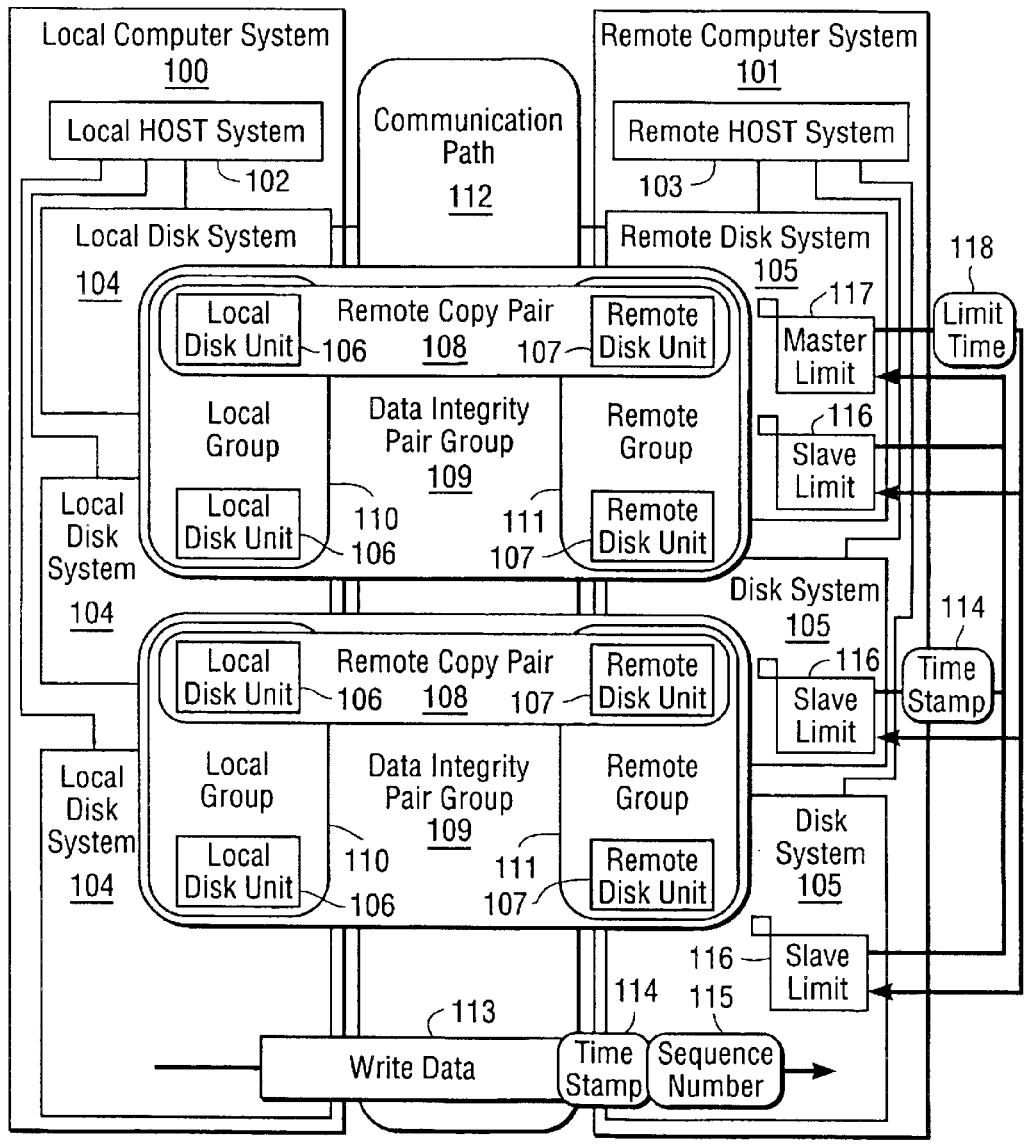
FIG. 1 is a generalized system diagram of the present invention.

Referring to FIG. 1, a computer system in accordance with one embodiment of the invention is shown. A local computer system 100 includes at least a local HOST system 102 and at least a local disk system 104. The remote computer system 101 includes at least a remote disk system 105. A remote HOST system 103 is not always necessary for the remote computer system 101. Each local disk system 104 is connected to a remote disk system 105 through a communication path 112. The communication path 112 is a network which is characterized in that transmitted data packets do not necessarily arrive in the order in which they were sent. An IP-based network exhibits this behavior. In general, a connectionless network exhibits this behavior. As an example, a wide area network (WAN) can be based on IP. The invention, however, is not limited to WAN's.

The local disk system 104 includes at least a local disk unit 106 which has an associated real time copy maintained in the remote disk system 105. The remote disk system 105 includes at least a remote disk unit 107 which contains a real time copy of a local disk unit 106. The pair comprising a local disk unit 106 and a remote disk unit 107 is called a remote copy pair 108. A group of remote copy pairs 108, among which data integrity must be guaranteed, is called a data integrity pair group 109. A group of local disk units 106 which belong to a data integrity pair group 109 is called a data integrity local disk group 110. Similarly at the remote system, a group of remote disk units 107 which belong to one data integrity pair group 109 is called a data integrity remote disk group 111.

The data integrity local disk group 110 may comprise local disk units 106 from a single local disk system 104, or from two or more local disk systems 104. Consequently, the constituent local disk units 106 of a local disk system 104 may found in one or more data integrity pair groups 109. The data integrity remote disk unit group 111 may comprise remote disk units 107 which belong to one or more remote disk systems 105. Consequently, a remote disk system 105 may have remote disk units 107 which belong to different data integrity pair groups 109.

During the course of operation of the local HOST system 102, data will need to be written to the local disk system 104. The local HOST will transfer "write data" 113 to be stored on the local disk system 104. The local disk system 104 also sends the write data 113 to a remote disk system 105 for data recovery. In accordance with the invention, when the local disk system 104 sends the write data 113 to be written to the remote disk system 105, it also sends time stamp 114 and a sequence number 115. The time stamp 114 shows the time when the local disk system received the request from the local HOST system 102. The sequence number 115 is the sequence number of the write data 113. The sequence number 115 is generated when a local disk unit 104 sends write data 113 to a remote disk system 105. The local disk system 104 selects the sequence number 114 and ensures that they are sequentially generated.

To realize data integrity, the order of data written on the remote disk units 107 in a data integrity pair group 109 needs to be same as the order of the same data written on the corresponding local disk units 106 of that data integrity pair group. To guarantee the data integrity in the data integrity pair group 109, it is necessary to compare the time stamps 114 from among the remote disk systems 105 because it is possible that one of the remote disk systems 105 will have received write data 1113 with a time stamp 114 of 7:00, while another of the remote disk systems 105 has yet to receive write data 113 with an earlier time stamp.

Thus, the remote system 101 includes plural slave limit time schedule processes 116. Each remote disk system 105 has an associated slave limit time schedule process 116. The remote system further includes a single master limit time schedule process 117. The slave limit time schedule processes 116 each send information for time stamp 114 to the master limit time schedule process 117. The master limit time schedule process 117 then decides the earliest time to permit de-staging to a remote disk unit 107. This earliest time is sent as a time limit 118 to each slave time limit scheduling process 116.

In accordance with the invention, the local disk system 104 sends a sequence number 115 with each packet of write data 113 to ensure data integrity in the remote copy system, even in the event that the data packets arriving at the remote system arrive out of order.

Figure 2:
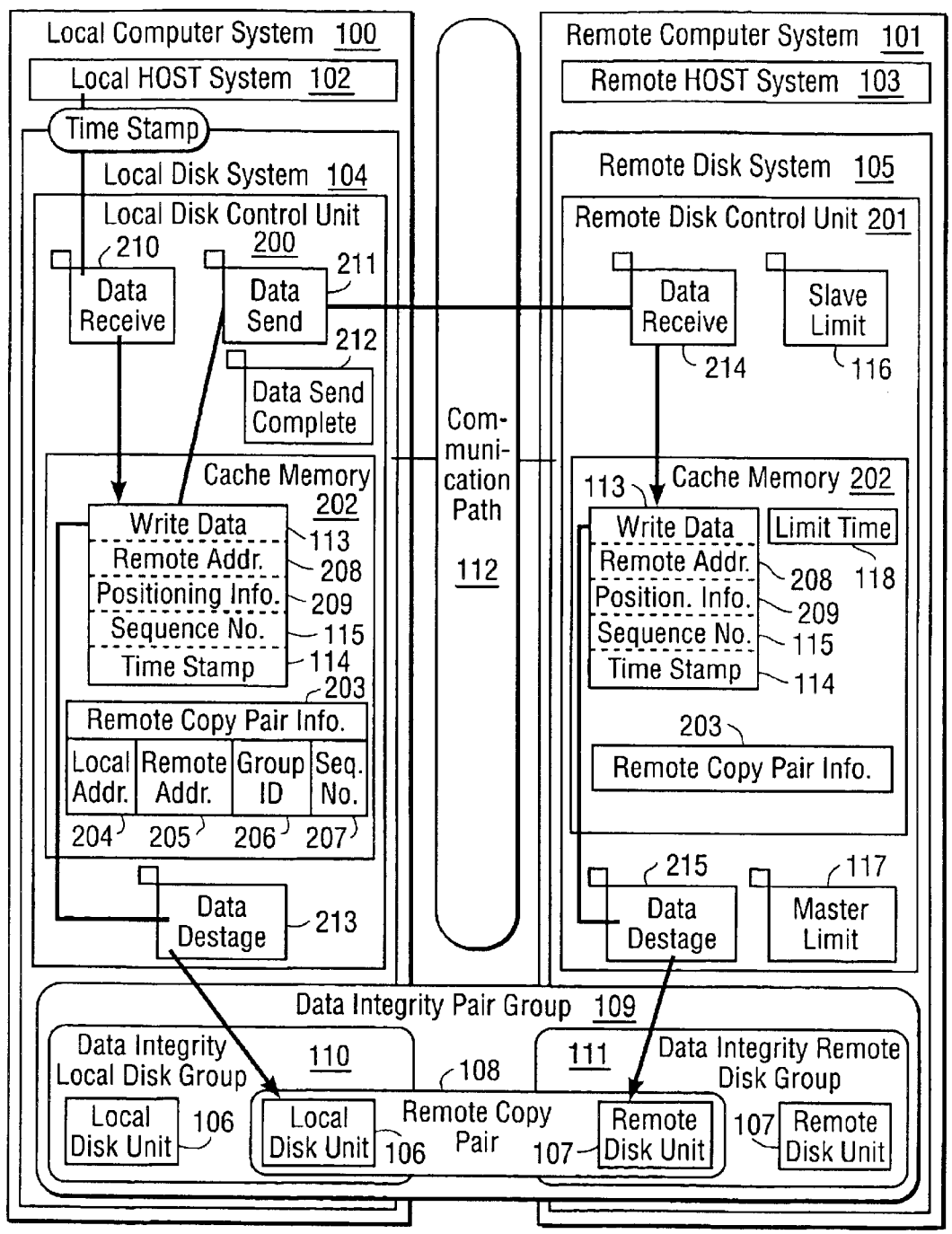
FIG. 2 is a generalized block diagram of one embodiment of the invention in which sequence numbers are allocated on a per remote copy pair basis.

Referring to FIG. 2, in an embodiment of the invention, the figure shows the processes in the local disk system and the remote disk system where every remote copy pair 108 has one sequence number. The local disk system 104 includes a local disk control unit 200 having a cache memory 202. The remote disk system 105 includes a remote disk control unit 201 with a cache memory 203.

The processes include an L-write data receive process 210, an L-write data send process 211, an L-write data send completion process 212, and an L-write data destage process on the local computer system 100. The remote computer system 101 includes an R-write data receive process 214, an R-write data destage process 215, and the master and slave limit time scheduling processes, 117, 116 respectively. Each process is activated in its respective local disk control unit 200 or remote disk control unit 201.

For each remote copy pair 108, there is a remote copy pair data store 203 which includes a local disk address 204, a remote disk address 205, a data integrity group id 206, and a sequence counter 207. The local disk address 204 and the remote disk address 205 are the destination addresses respectively of the local disk unit and remote disk unit which comprise the remote copy pair 108, for a write operation. The data integrity pair group id 206 identifies to which data integrity pair group 109 the remote copy pair belongs. As shown in FIG. 2, each remote copy pair 108 has an associated sequence number 115. The sequence counter 207 provides the sequence number 115 that is associated with the write data 113 that is sent to the remote disk.

The cache memory 202 also contains, for each remote copy pair 108, a data structure comprising write data 113, a remote disk address 208, positioning information 209, a sequence number 115, and a time stamp 114. Thus, there is one such data structure for each block of write data that is sent to the local disk system from the local HOST 102, thereby resulting in plural such data structures for a typical write operation by local HOST 102. The positioning information is, for example, the disk block address on disk drives commonly found in personal computers. In conventional mainframe systems, the positioning information is typically the cylinder number, head number, and record number.

Figure 5:
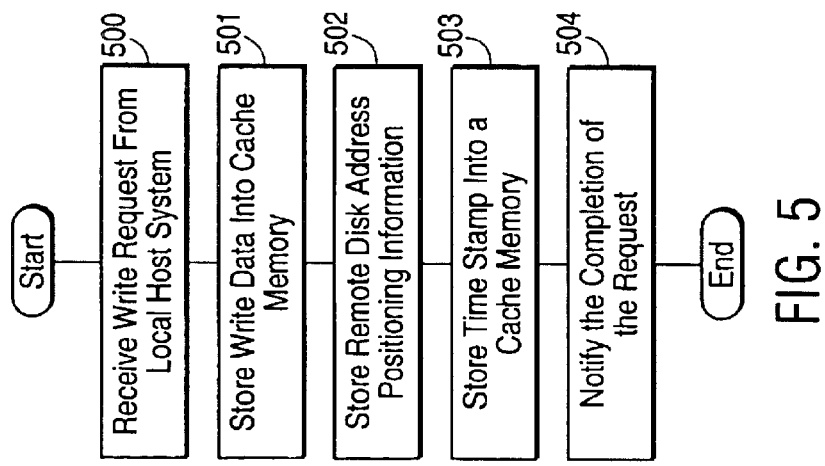

Referring now to FIGS. 2 and 5, the processing of the L-write data receive process 210 will be described. This process is executed in the local disk system when it receives a write request from the local HOST system 102. First, the local disk system 104 receives a write request from the local HOST system 102 (step 500). A write request specifies the address information of the local disk unit 106 and the position on the local disk unit 106 to which the write data 113 is written. Next, the local disk system 104 receives the actual write data 113 to be written and caches it in cache memory 202 (step 501). The local disk system 104 obtains the remote disk address 205 of the corresponding remote disk unit 107 in the remote copy pair 108 from the remote copy pair data store 203 and stores it in the cache memory as remote disk address 208. The position specified in the write request is stored in the cache memory as position information 209 (step 502). The local disk system then receives a time stamp from the local HOST system and stores it into the cache memory 202 as time stamp 114 (step 503). The time stamp 114 can be generated other than by the local HOST system 104, so long as the time stamp 114 that is produced is common to all of the local disk systems 104. In an embodiment where there are more than one local HOST systems 102, a shared clock is assumed to exist which provides a common time stamp value amongst the HOST systems. Finally, the local disk system 104 indicates to the local HOST system 102 the completion of the write request (step 504).

Figure 6:
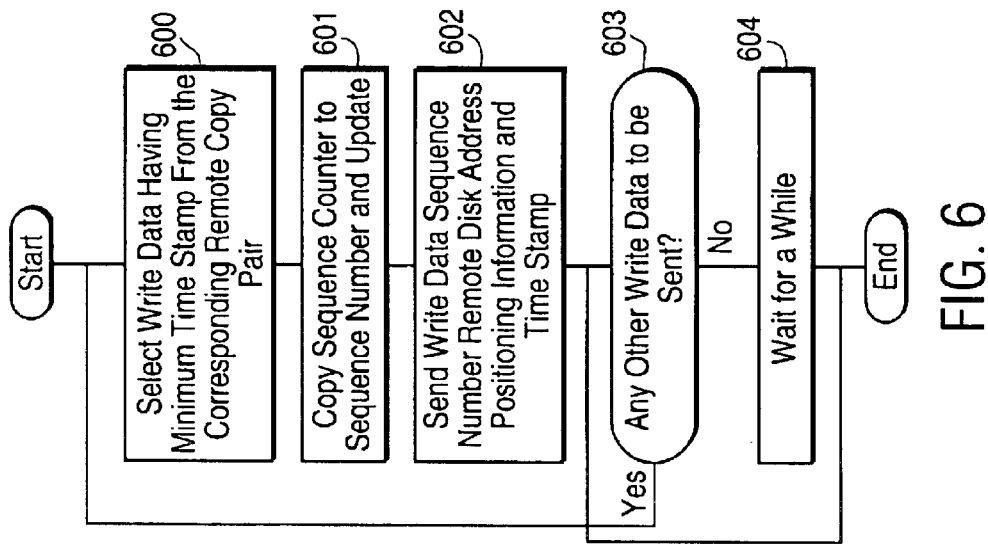

Referring to FIGS. 2 and 6, the processing of the L-write data send process 211 will be described. This process is executed when the local disk system is ready to send write data 113 to the remote disk system 105. In accordance with the embodiment of the invention shown in FIG. 2, there is an L-write data send process 211 for each remote copy pair 108. This process is executed asynchronously relative to the L-write data receive process 210.

The local disk system 104 selects the write data 113 whose associated time stamp 114 is the earliest in time from among all of the write data 113 that are waiting in the remote copy pair 108 to be sent to the remote disk system (step 600). The local disk system then takes the current value of the sequence counter 207 as the sequence number 115 that will be associated with the selected write data 113 (i.e., the write data whose associated time stamp is the earliest in time). The sequence counter 207 is incremented (step 601). Next, the selected write data 113 and its associated time stamp 114, sequence number 115, remote disk address information 208, and position information 209 are sent to the remote disk system 105 (step 602, see also FIG. 1).

In accordance with the invention, the L-write data send process 211, then proceeds to process the next write data 113 without waiting for any indication from the remote disk system 105 as to completion. In this manner, high data transfer rates are realized. However, there is the possibility of packets arriving out of sequence. Hence, the local disk system 104 checks whether there are any write data 113 that belong to the remote disk system 105 in the remote copy pair 108 which have not yet been sent (step 603). If so, processing continues at step 600. If not, then the process waits for a while (step 604) and then continues at step 603.

The waiting in step 604 is to accommodate the situation where there is no write data to be sent. If there is no write data to send in step 603, the L-write data send process 211 has no processing to do. Consequently, step 604 is used to pause the process for a while before checking again to see if there is write data to send.

Figure 7:
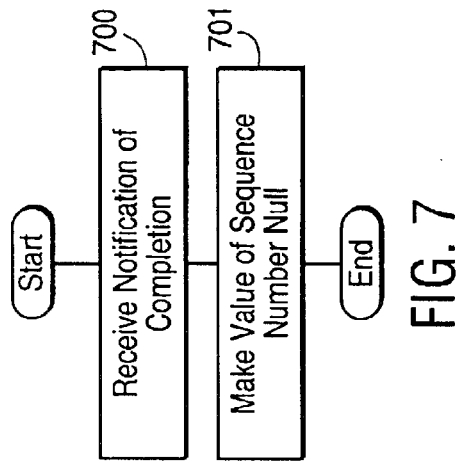
FIGS. 5–11 outline process flows in accordance with one embodiment of the invention.

Referring now to FIGS. 2 and 7, the processing in the L-write data send completion process 212 will be described. This process is executed when the local disk system 104 receives a notification of the completion of the transfer of the write data 113 to the remote disk system 105. The local disk system receives the notification of the transfer of the write data 113 from the remote disk system 105 (step 700). The local disk system 104 then makes the value of the corresponding time stamp 114 and the sequence number 115 NULL. Since the write data 113 has already been sent to the remote disk system 105, these fields are no longer used by the local disk system 104.

After the transfer of write data 113 to the remote disk system 104 is completed, the write data 113 is then written to the local disk unit 104 by the L-write data destage process 213. This process results in the actual writing of the write data 113 to the local disk unit 106 and is performed according to known conventional methods.

Figure 8:
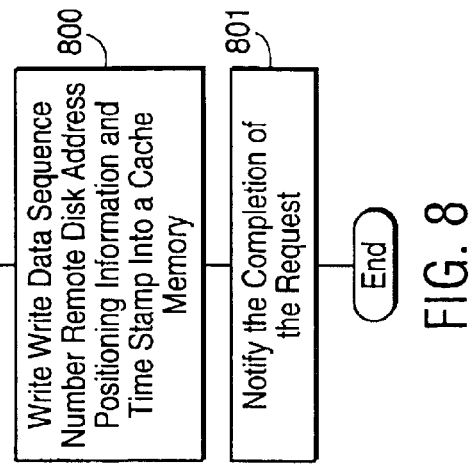

Referring now to FIGS. 2 and 8, the R-write data receive process 214 will be discussed. This process is executed in the remote disk system 105 when it receives write data 113 from the local disk system 104. In accordance with the embodiment of the invention shown in FIG. 2, there is an R-write data receive process 214 for each remote copy pair 108. The remote disk system 105 stores the received write data 113 and its associated time stamp 114, sequence number 115, remote disk address information 208, and position information 209 into cache memory 203 (step 800). The remote disk system 105 sends a completion indication of the transfer of the write data 113 along with its sequence number 115 back to the local disk system (step 801).

The cache memory 203 contains, for each remote copy pair 108, a data structure comprising a received write data 113, a remote disk address 208, positioning information 209, a sequence number 115, and a time stamp 114. Thus, there is one such data structure for each block of write data 113 that has been received from the local HOST 102, thereby resulting in plural such data structures.

Figures 9, 10, 11:
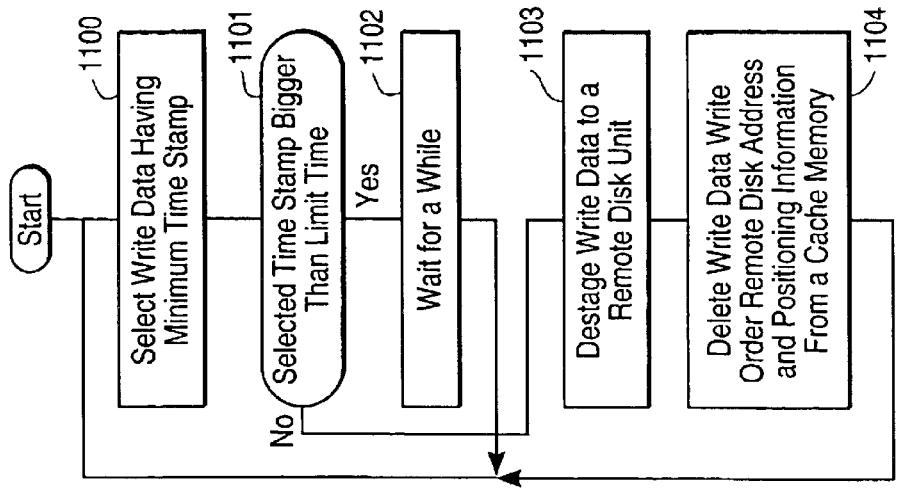

Referring now to FIGS. 2 and 9, the slave limit time schedule process 116 will be described. The slave process 116 executes for a period of time and terminates. This process is activated periodically. Recall that in the embodiment of the invention shown in FIG. 2, each remote copy pair 108 has an associated sequence number 115. In fact, for each block of write data 113 that is waiting in a remote copy pair 108, there is an associated sequence number 115. Thus, each remote copy pair 108 may have a list of sequence numbers 115. Recall further that a remote disk system 105 may have more than one remote copy pair 108 associated with it. Consequently, each remote disk system 105 may have more than one list of sequence numbers.

For each remote copy pair 108, the slave limit time schedule process 116 inspects the list of sequence numbers in that remote copy pair (step 901). It finds the longest run of numbers that are sequential and returns the maximum sequence number from that run. For example, suppose a remote copy pair contained the following list of sequence numbers:

..., 11, 12, 13, 14, 15, 16, 17, 18, 19, 20, 21, 22, 23, 24, 25, 26, 28, 29

In the above example, the sequence numbers which are 26 or less than 26 are sequential because the sequence number 27 has not been yet received. And so the process will select '26' which is the highest-valued sequence number in the run.

Next, the process searches the time stamp 114 associated with the highest-valued (maximum) sequence number. This is repeated for each remote copy pair, resulting in a list of time stamps.

From this list of time stamps, the earliest time stamp is selected (step 901). Each slave limit time schedule process 116 produces one such earliest time stamp in this manner. The earliest time stamp from each slave process is then delivered to the master time limit schedule process 117 (step 902, see also FIG. 1). Each slave process then waits (step 903) to receive a limit time value 118 from the master limit time schedule process 117 and stores the value in cache 202 (step 904, see also FIG. 1).

Referring now to FIGS. 2 and 10, the master limit time schedule process 117 will be described. This process is activated when the remote disk system receives time stamps 114 from each of the slave processes 116. The master process 117 selects the earliest time stamp from among the received time stamps (step 1000) and sends the selected time stamp as a limit time 118 to each slave process 116 (step 1001).

Referring now to FIGS. 2 and 11, the R-write data destage process 215 will be described. This process is executed when the remote disk system 105 destages write data 113 associated with a remote copy pair 108 onto the remote disk unit 107 associated with that remote copy pair 108. The remote disk system 104 selects a candidate write data 113 whose associated time stamp 114 is the earliest (step 1100). Then it compares the selected time stamp with the limit time 118 (step 1101) defined by the master limit time schedule process 117. If the selected time stamp 114 is later than the limit time 118, then the remote disk unit 105 waits for a while (step 1102) and then continues processing at step 1100. If the selected time stamp 114 is equal to or earlier than the limit time 118, then the remote disk system 105 destages (i.e., writes out to disk) the candidate write data 113 according to its associated remote disk address 208 and position information 209 (step 1103). The write data and its associated time stamp, sequence number, remote disk address information 208, and position information 209 are removed from cache memory 203 (step 1104).

The following example will be helpful. Suppose we have the following:

write data A, time stamp 10:00
write data B, time stamp 10:02
write data C, time stamp 10:04
:
:
limit time: 10:01

In this example, the R-write data destage process selects write data A, which has the earliest time stamp (10:00). Next, the R-write data destage process destages write data A to a remote disk unit 107 because its time stamp (10:00) is earlier than the limit time (10:01). After the destaging of the write data A, write data B has the earliest time stamp. However, write data B cannot be destaged because the limit time (10:01) is earlier than the write data B's time stamp (10:02). The destaging of the write data B will become possible after the limit time 118 is updated to a time later than 10:02 by the slave limit time schedule process 116 and the master limit time schedule process 117 (shown in FIG. 9 and FIG. 10).

Figure 3:
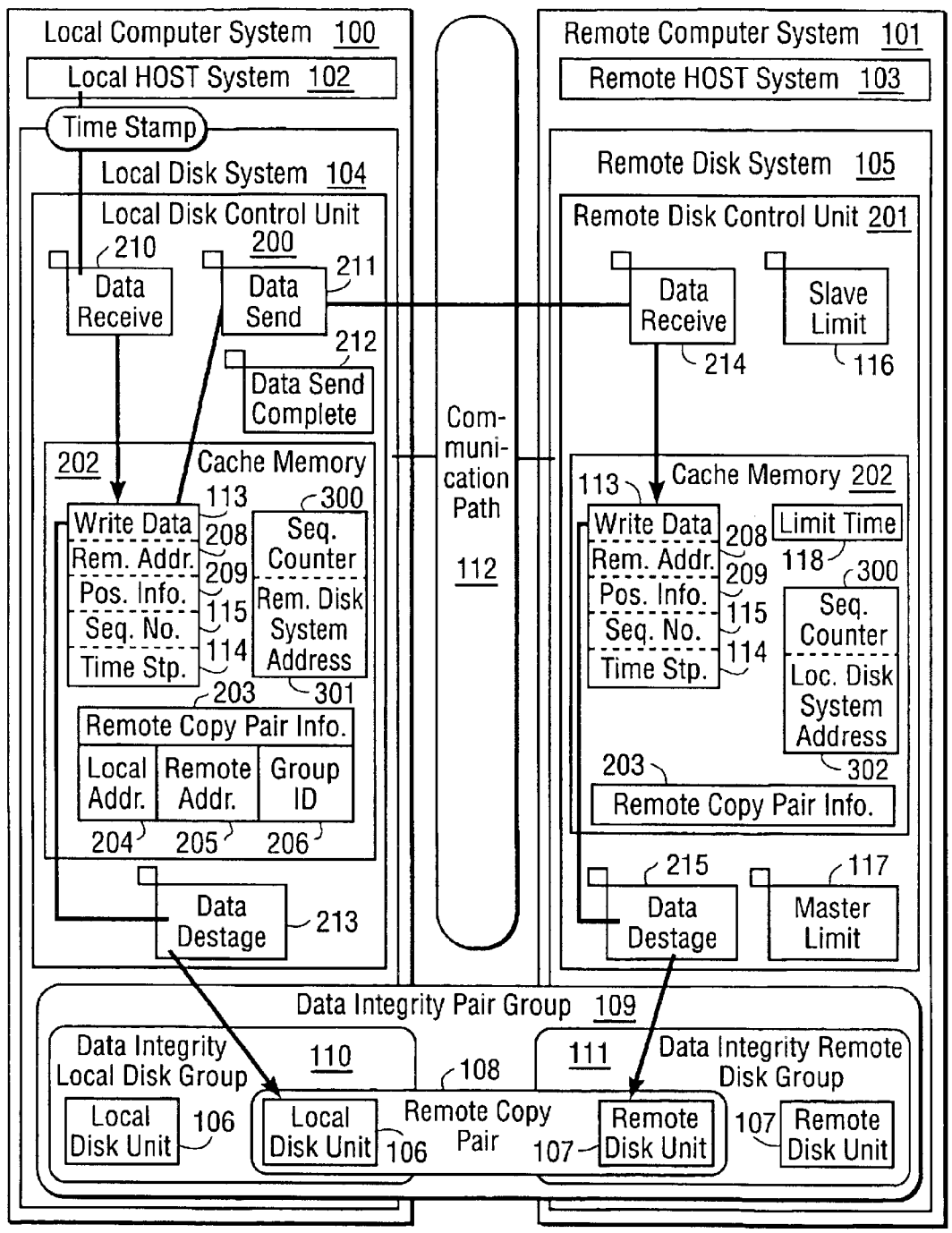
FIG. 3 is a generalized block diagram of another embodiment of the invention in which sequence numbers are maintained on a per remote disk system basis.

Referring now to FIG. 3, another embodiment of the invention will be described. The system diagram of FIG. 3 is essentially the same as that shown for FIG. 2, with the following differences. In the embodiment of the invention shown in FIG. 3, there is a sequence number 115 for each remote disk system 105 that is associated with the local disk system 104. Recall in FIG. 2, there is a sequence number for each remote copy pair 108. However, for the embodiment shown in FIG. 3, the local disk system 104 has one sequence number 115 for each remote disk 104 system which shares at least one remote copy pair 108 with that local disk system. Thus, as can be seen in FIG. 3, there is a data pair comprising a sequence counter 300 and a remote disk system address 301, for each remote disk system. Thus, if a local disk system is associated with two remote disk systems, there will be two such data pairs contained in the local disk system.

In the embodiment shown in FIG. 3, the L-write data receive process 210 is the same as described in connection with the embodiment shown in FIG. 2.

Referring now to FIGS. 2 and 12, the L-write data send process 211 for the embodiment of the invention shown in FIG. 3 will be described. There is an L-write data send process 211 for each remote disk unit which shares at least one remote copy pair 108 with this local disk system 104. The local disk system 104 selects the write data 113 whose time stamp 114 is the earliest in time from all of the write data 113 belonging to the corresponding remote disk system 105 and which have not yet been sent to the remote disk system 105 (step 1200). The local disk system 104 then copies the current value of the sequence counter 300 corresponding to that remote disk system into the sequence number 115 associated with the selected write data 113 (i.e., the write data whose associated time stamp is the earliest in time). The sequence counter 300 is incremented (step 601). Next, the selected write data 113 and its associated time stamp 114, sequence number 115, remote disk address information 208, and position information 209 are sent to the remote disk system 105 (step 602). The process then continues in accordance with the description for FIG. 6.

In the embodiment of the invention shown in FIG. 3, the L-write send completion process 212 is the same as described in connection with the embodiment of the invention shown in FIG. 2.

In the embodiment shown in FIG. 3, the remote disk system 105 includes a data pair comprising a sequence counter 300 and a local disk system address 302, for every local disk system 104 which shares a remote copy pair 108 with the remote disk system 105. There is one such data pair for each local disk system that is associated with the remote disk system.

There is an R-write data receive process 214 for every local disk system which shares a remote copy pair 108 with the local disk system 105. In the embodiment of FIG. 3, the R-write data receive process 214 is the same as described in connection with the embodiment shown in FIG. 2. Similarly, the master limit time schedule process 117 and the R-write data destage process 215 are the same as described for the embodiment of the invention shown in FIG. 2.

Referring now to FIG. 13, the slave limit time schedule process 116 in accordance with the embodiment of the invention shown in FIG. 3 will be discussed. There is a slave process for each remote disk system 105. This process is essentially the same as for the embodiment of FIG. 2, with the following difference.

For each local disk system 104 that shares at least one remote copy pair 108, the slave limit time schedule process 116 inspects the list of sequence numbers received from that local disk system 104 (step 1300). It finds the maximum sequence number of the sequence numbers 114 that are sequential and returns the time stamp 115 corresponding to the maximum sequence number. This is repeated for each local disk system that shares at least one remote copy pair 108 with the remote disk system to produce a list of time stamps. From this list of time stamps 11, the earliest time stamp is selected (step 901) and delivered to the master time limit schedule process 117 (step 902). Thus, each slave limit time schedule process 116 searches one such earliest time stamp for each remote disk system 105. The process then waits (step 903) to receive a limit time value 118 from the master limit time schedule process 117 and stores the value in cache 202 (step 904).

Figure 4:
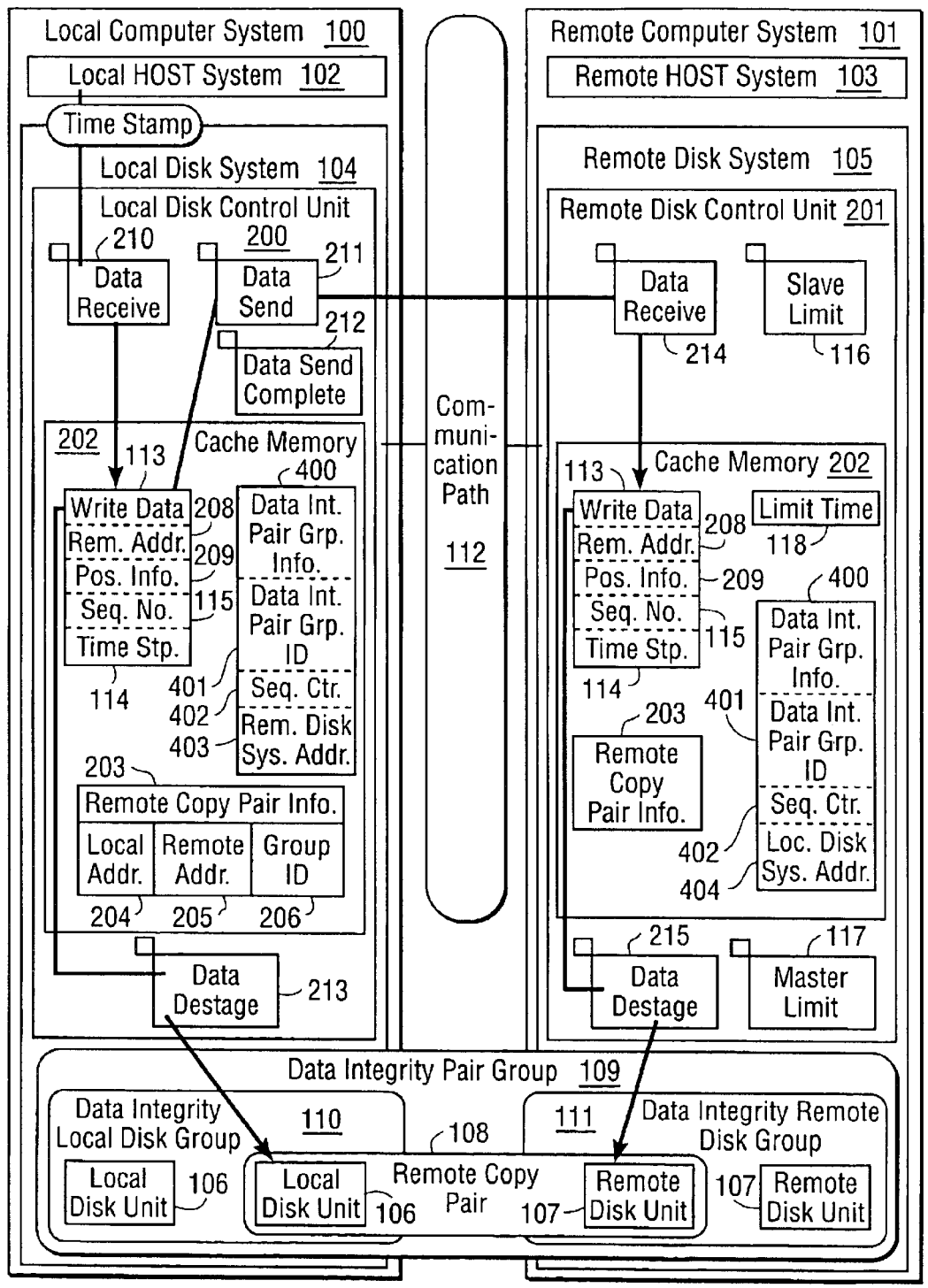
FIG. 4 is a generalized block diagram of another embodiment of the invention in which sequence numbers are managed on a per data integrity pair group basis.

Referring now to FIG. 4, another embodiment of the invention will be discussed. The system diagram of FIG. 4 is essentially the same as that shown for FIG. 2, with the following differences. In the embodiment of the invention shown in FIG. 4, local disk system has a sequence number 115 for each remote disk system 105 that has a data integrity pair group 109 in common with that local disk system 104. Consider, for example, that a local disk system X has an associated data integrity pair group Z. The data integrity pair group in turn comprises five remote copy pair groups, RCP1–RCP5. Consider further that remote copy pair groups RCP1 and RCP2 are associated with remote disk system A, remote copy pair RCP3 is associated with remote disk system B, and RCP4 and RCP5 are associated with remote disk system C. In this particular example, the local disk system X will have three sequence numbers associated with data integrity pair group Z.

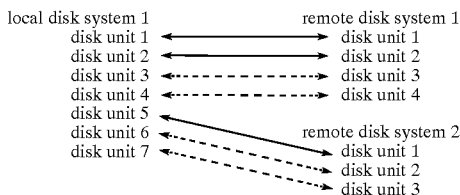

The differences among the embodiments shown in FIGS. 2–4 are illustrated in the exemplary configuration shown above, where a local disk system 104 has seven local disk units and two remote disk systems 105. The double arrow indicates a remote copy pair; e.g. local disk unit 5 and remote disk unit 1 define a remote copy pair 108. In addition, the solid-lined remote copy pairs together define one data integrity group, while the broken-lined remote copy pairs together define a second data integrity group.

Thus, in accordance with the embodiment of the invention shown in FIG. 2, the local disk system 104 would have an associated sequence number 114 for each of its disk units (a total of seven sequence numbers). In accordance with the embodiment shown in FIG. 4, the local disk system 104 has two associated sequence numbers, one for each remote disk system 105 which has a remote copy pair in common with the local disk system 105. In accordance with the embodiment shown in FIG. 4, the local disk system 104 has four associated sequence numbers 114, one for each remote disk system 105 that shares a data integrity pair group 109 with the local disk system 104. The solid-lined data integrity pair group is shared between the two remote disk systems 104; likewise, the broken-lined data integrity pair group is shared between the two remote disk systems 104.

Now continuing with FIG. 4, as can be seen, there is a data integrity pair group information data structure 400 in the local disk system 104 for each remote disk system 105 that is associated with the local disk system 104 via a data integrity pair group 109. The data structure 400 includes a data integrity group id 401 and one or more data pairs comprising a remote disk system address 403 and a sequence counter 402. There is one such data pair for each remote disk system 105 in the data integrity pair group 109. The remote disk system 105 includes a similar data structure, for each local disk system 104 that is associated with the remote disk system 105 via a data integrity pair group 108.

In the embodiment of the invention shown in FIG. 4, the L-write send completion process 210 and the L-write send completion process 212 operate in accordance with embodiment of the invention shown in FIG. 2.

Figure 14:
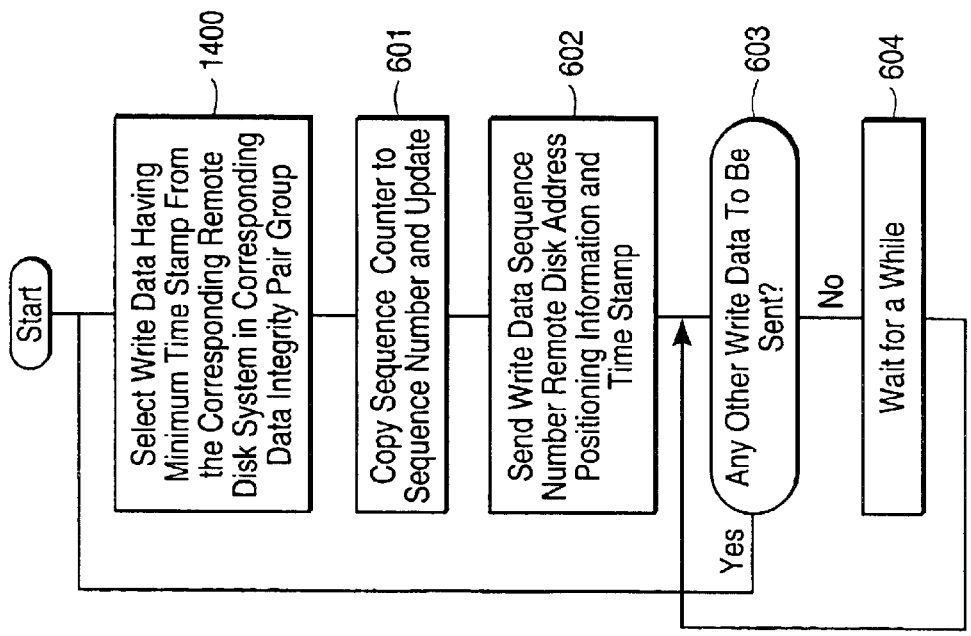
FIG. 14 shows another alternate embodiment of the process flow shown in FIG. 6.

Referring now to FIG. 14, the L-write data send process 211 for the embodiment of the invention shown in FIG. 4 will be described. There is an L-write data send process 211 for each remote disk unit which shares at least one data integrity pair group 109 with this local disk system 104. The local disk system 104 selects the write data 113 whose time stamp 114 is the earliest in time from all of the write data 113 belonging to the corresponding data integrity pair group 109 and which have not yet been sent to the remote disk system 105 (step 1400). The local disk system then copies the current value of the sequence counter 403 corresponding to the target remote disk system into the sequence number 115 associated with the selected write data 113 (i.e., the write data whose associated time stamp is the earliest in time). The sequence counter 403 is incremented (step 601). Next, the selected write data 113 and its associated time stamp 114, sequence number 115, remote disk address information 208, and position information 209 are sent to the remote disk system (step 602). The process then continues in accordance with the discussion for FIG. 6.

In the embodiment of the invention shown in FIG. 4, an R-write data receive process 214 is associated with each local disk unit 104 that shares a data integrity pair group 109 associated with this remote disk system 105. Processing proceeds in accordance with the flow chart shown in FIG. 8.

The master limit time schedule process 117 and the R-write data destage process 215 operate in the same manner as described for the embodiment of the invention shown in FIG. 2.

Figure 15:
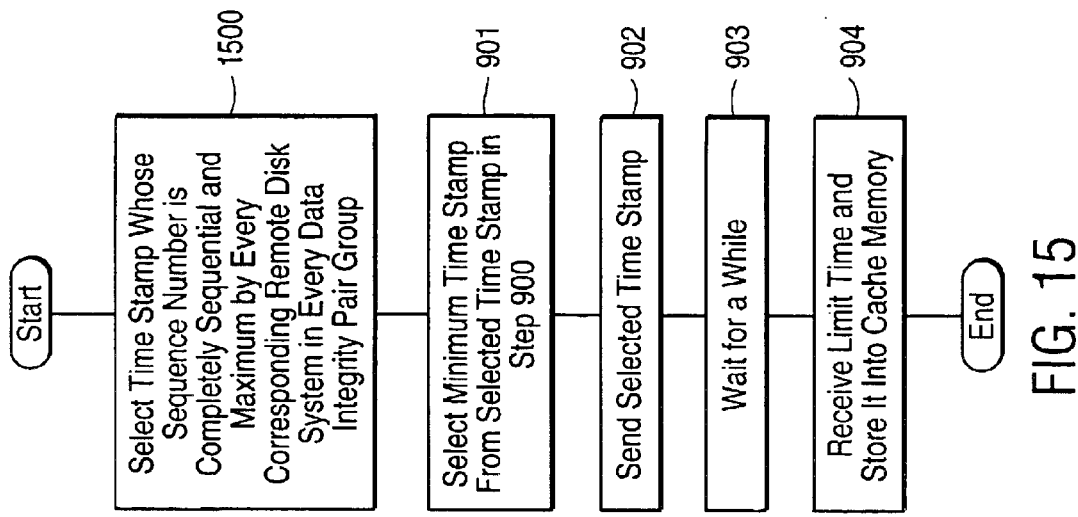
FIG. 15 shows another alternate embodiment of the process flow shown in FIG. 9.

Referring now to FIG. 15, the slave limit time schedule process 116 in accordance with the embodiment of the invention shown in FIG. 4 will be discussed. There is a slave process for each remote disk system 105. This process is essentially the same as for the embodiment of FIG. 2, with the following difference.

For each local disk system 104 that is associated with the remote disk system via a data integrity pair group, the slave limit time schedule process 116 inspects the list of sequence numbers received from that local disk system (step 1500). It finds the maximum sequence number of the sequence numbers 114 that are sequential and returns the time stamp 115 corresponding to the maximum sequence number. This is repeated for each local disk system 104 associated with the remote disk system via a data integrity pair group 109 to produce a list of time stamps. From this list of time stamps, the earliest time stamp is selected (step 901) and delivered to the master time limit schedule process 117 (step 902). Thus, each slave limit time schedule process 116 searches one such earliest time stamp for each remote disk system 105. The process then waits (step 903) to receive a limit time value 118 from the master limit time schedule process 117 and stores the value in cache 202 (step 904).

Figure 16:
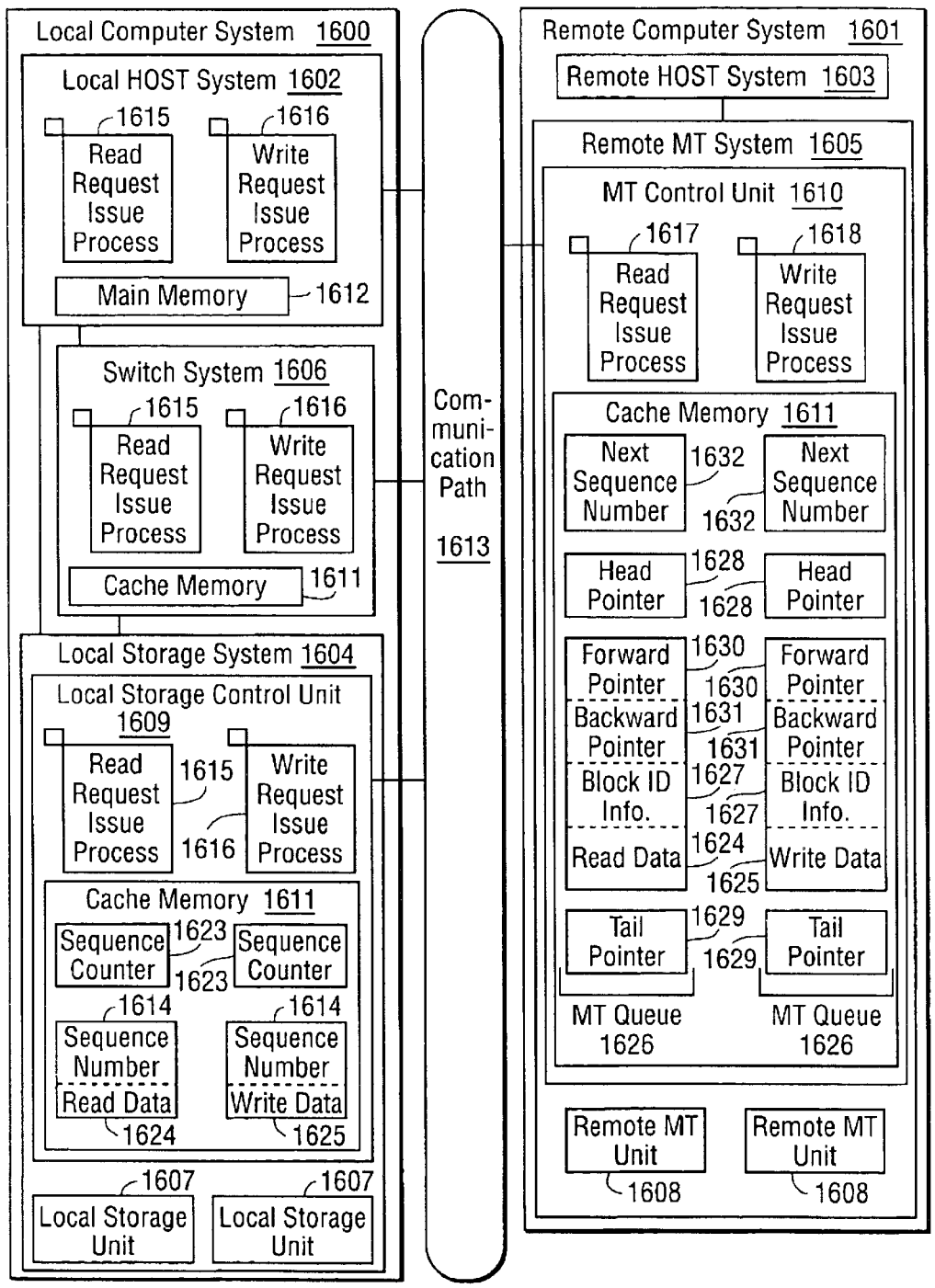
FIG. 16 shows a magnetic tape storage system embodiment of the present invention.

Turn now to FIG. 16 for a discussion of an embodiment of the invention in the context of magnetic tape (MT) storage systems deployed at the remote site. A local computer system 1600 includes at least a local HOST system 1602 and at least a local storage system 1604 such as a local disk system. The local computer system may include a switch system 1606. There is a remote computer system 1601 that includes at least a remote MT system 1605. The remote HOST system 1603 is not always present in the remote computer system 1601.

The local HOST system 1601, the local disk system 1604, and the switch system 1606 are connected to the remote disk system 1605 via a communication path 1613. The communication path 1613 is a network which is characterized in that transmitted data packets do not necessarily arrive in the order in which they were sent. For example, an IP-based network exhibits this behavior. In this embodiment of the invention, a unit of read/write data is called a block. Each block has a block id which is used to identify itself.

A local storage system 1604 has at least one local storage unit 1607 and a storage control unit 1609 with a cache memory 1611. The remote MT system 1605 includes at least one remote MT unit 1608 and an MT control unit 1610 with a cache memory 1611. The local HOST system 1602 has a main memory 1612. The switch system 1606 also includes a cache memory 1611.

In accordance with the embodiment of the invention shown in FIG. 16, a read request and a write request to a remote MT unit 1608 each includes a sequence number 1614 that accompanies the data to be read 1624 or written 1625.

FIG. 16 also shows the processes of the local HOST system 1602, the local disk system 1604, the remote MT system 1605, and the switch system 1606. A read request issue process 1615 and a write request issue process 1616 are provided in the local HOST system 1602, the local disk system 1604, and the switch system 1606. The remote MT system 1605 includes a read request receive process 1617 and a write request receive process 1618.

Figure 17:
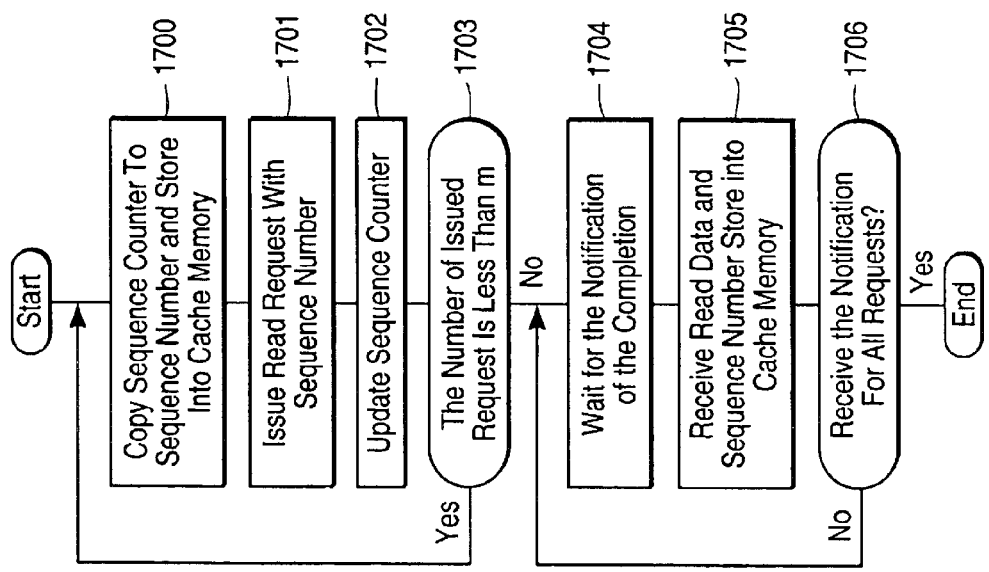

Processing of the read request issue process 1615 is outlined in FIG. 17. This flow is common among the local HOST system 1602, the local storage system 1604 and the switch system 1606. A sequence counter 1623 that is copied to cache memory 1611 of the local storage control unit 1609 (or into main memory 1612) provides the value for sequence number 1614 when a read/write request is issued (step 1700). The process then issues a read request to the remote MT system 1605 (step 1701). The process then increments the sequence counter 1623 (step 1702).

Next (step 1703), the read request issue process checks the number of requests that have been issued. If the number is less than a value m, processing continues at step 1700 in order to issue a next request. The value for m is typically >2, and preferably is determined empirically. The goal is to obtain better performance by sending the next request before the completion of the present request.

If the number is not less than m, then the process waits for a data transfer notification from the remote MT system 1605 (step 1704). When the read request issue process 1615 receives a data transfer notification from the remote MT system 1605, it receives the read data 1624 and the sequence number 1614 and stores it into cache memory 1611 (or into main memory 1612) (step 1705) according to the sequence counter 1623. Next, the read request issue process 1615 checks if it has received all the data transfer notifications from the remote MT system 1605 (step 1706). If not, the process continues at step 1703 to wait for the data transfer notification.

Figure 18:
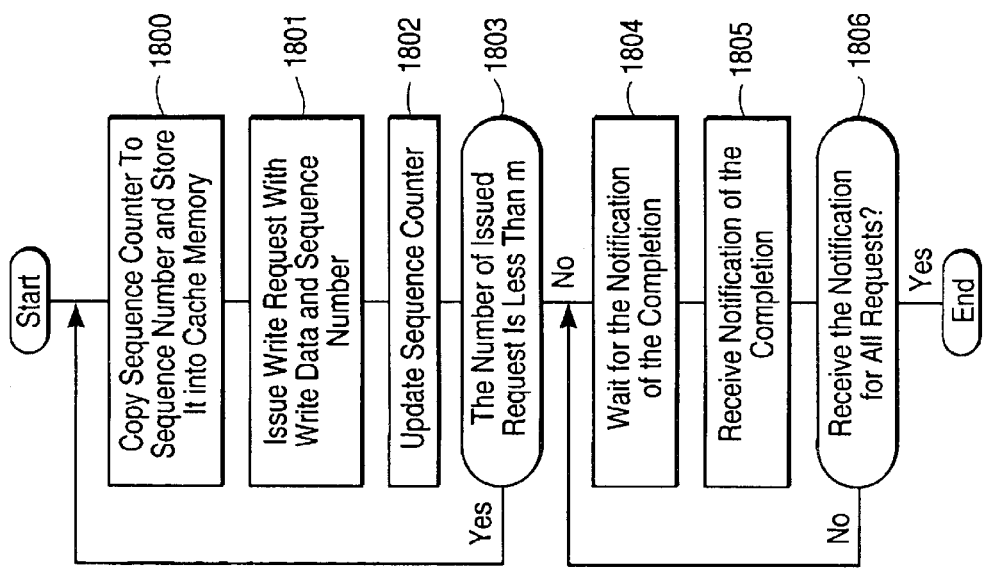

Processing of the write request issue process 1616 is outlined in the flowchart shown in FIG. 18. This flow is common among the local HOST system 1602, the local storage system 1604, and the switch system 1606. The write request issue process copies the contents of the sequence counter 1623 to the sequence number 1614 into a cache memory 1611 (or into main memory 1612) (step 1800), and issues a write request with the sequence number 1614 and write data 1625 to the remote MT system 1605 (step 1801). Then it increments the sequence counter 1623 (step 1802). In step 1803, the write request issue process 1616 checks the number of requests issued. If the number is less than the value m, it jumps to step 1800 to issue a next request. If not so, it waits for the notification of the data transfer from the remote MT system (step 1804). When the write request issue process 1616 receives the notification from the remote MT system 1605 (step 1805), it then checks if it has received all the data transfer notification from a remote MT system 1605 (step 1806). If not so, it jumps to step 1803 to wait for the data transfer notification.

The flow of the read request receive process 1617 in the remote MT system 1605 is shown in FIG. 19. The remote MT system 1605 has the read data 1624 in the cache memory 1611 of the MT control unit 1610. A group of read data 1624 is read from one remote MT unit 1608 and stored into an MT queue 1626. Each queue entry is a data pair comprising the read data 1624 and its corresponding block id information 1627. Read data 1624 and its block id information 1627 are inserted into the queue according to the block id information 1627. The MT queue 1626, therefore, is ordered by block id information 1627. This ordering represents the order in which the data blocks should be sent back to the requesting local HOST 1601. Thus, a series of read requests, if received in proper sequence, would be satisfied simply by sending each data block in the order that they occur in the MT queue 1626.

The queue 1626 is a doubly-linked data structure. Each queue entry therefore further includes a forward pointer 1630 which points to a queue entry including next block id information 1627 and a backward pointer 1631 which points to a queue entry including previous block id information 1627. A head pointer 1628 points to the head of the MT queue 1626 and a tail pointer 1629 points to the tail of the MT queue 1626. A next sequence number counter 1632 contains the sequence number 1614 corresponding to the read data 1624 that should be accessed by a next read request. Hence, the current value of the counter 1632 corresponds to the data block at the head of the MT queue.

In operation, the read request receive process 1617 receives, from a local HOST 1601, a read request with a sequence number 1614 (step 1900). The read request receive process compares the received sequence number 1614 to the next sequence number counter 1632 (step 1901). If it is equal, the process sends the received sequence number 1614 and the read data 1624 at the head of the MT queue 1626 (pointed to by head pointer 1628), along with the received sequence number 1614 to a read request issue process 1615 (step 1902). The sequence number counter 1632 is then updated, referring to the block id information 1627 of the next read data 1624 in the MT queue (step 1903). The process then continues at step 1907.

If the received sequence number is not equal to the next sequence number counter 1632, this means that an out-of-sequence read request has been received. In step 1904, the read request receive process 1617 calculates the block id information 1627 of the read data to be requested. Specifically, the read request receive process obtains the difference D between the next sequence number counter 1632 and the received sequence number 1614 and adds the difference D to the block ID information B of the read data 1624 at the top of the MT queue 1626. That is, B+D is the block id information 1627 to be found. In step 1905, the read request receive process searches the queue entry whose block id information 1627 is B+D. The read data 1624 at that entry in the queue 1626, along with the received sequence number 1614, is sent to the read request issue process 1615 (step 1906). Processing continues to step 1907.

In step 1907, the read request receive process 1617 deletes the queue entry corresponding to the sent read data 1624. Thus, by using a sequence number 1614, the remote MT system 1605 can recognize the accessed read data 1624 without mistake even if the read requests becomes out of sequence due to the nature of the communication path 1613. Referring back to FIG. 17, the received data is assembled according to the received sequence number 1614. Thus, if the read requests at the remote system get out of sequence, the sequence number ensures that they are satisfied in correct order. Likewise, if the received data at the local system get out of order, it is assembled correctly because of the sequence number 1614.

The flow of the write request receive process 1618 in the remote MT system 1605 is shown in FIG. 20. The structure of the MT queue 1626 for data to be written is same as that of the read data 1624. In the case of write data 1625, a next sequence number counter 1632 in the MT unit 1605 is greater than the sequence number 1614 of the write data pointed to by tail pointer 1629 by one.

A write request receive process 1618 at the remote computer receives a write request with sequence number 1614 and write data 1625, and stores the write data into cache memory 1611 (step 2000). Next, the write request receive process 1618 checks whether the sequence number 1614 is equal to or more than a next sequence number counter 1632 (step 2001). If equal, it inserts the received write data 1625 at the tail of the corresponding write MT queue 1626, thus updating the information in the MT queue (step 2002). It then calculates the block id of received write data 1625 and stores it into block id information 1627 (step 2003). Then it adds D2 (the difference between the sequence number 1614 and the next sequence number counter 1632)+1 to the next sequence number counter 1632 (step 2004) and jumps to step 2009.

If the received sequence number is less than the next sequence number counter 1632, then it computes the difference between the next sequence number counter 1632 and the received sequence number 1614 (step 2005). It finds the position of the MT queue 1626 to insert the write data 1624, thus updating the information in the MT queue (step 2007). Then it calculates a block id of the received write data 1625 and stores it into block id information 1627 (step 2008). Next, the write request receive process notifies the completion of the write request and sends back the received sequence number 1614 to the write request issue process 1616 (step 2009). Thus, by using a sequence number 1614, the remote MT system 1605 can also recognize the block id of the write data 1625 without mistake, even if the write request gets out of sequence due to the communication path 1613.

Figure 21:
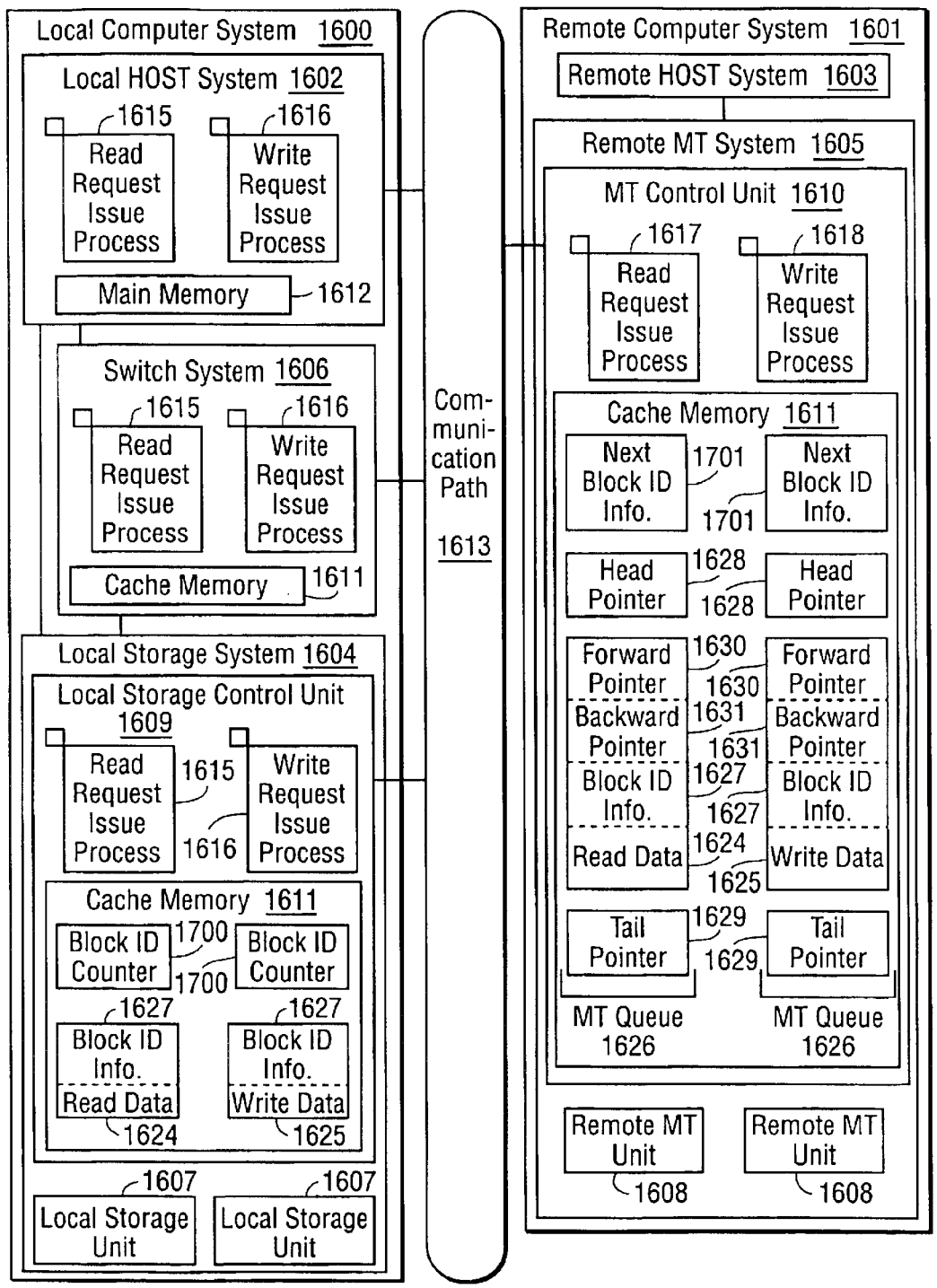
FIG. 21 is another magnetic tape embodiment of the invention.

FIG. 21 shows another embodiment of the present invention for MT storage systems. This embodiment of the invention is essentially the same as the embodiment shown in FIG. 16. The difference is the use of a next block id information 1700, 1701 in place of the sequence number 1614 used in FIG. 16 to detect out of sequence occurrences and to correct for such occurrences.

What is claimed is:

1. A storage system comprising:
   a first storage component comprising a first disk system, the first disk system comprising a first disk control unit and one or more first disk units; and
   a second storage component comprising a plurality of second disk systems, each second disk system comprising a second disk control units and one or more second disk units,
   the first and second storage components configured to exchange data over a data network,
   the first disk system configured to receive a block of data from a host computer and to transmit a data packet to one of the second disk systems, the data packet including the block of data, a time stamp, and a sequence number,
   each of the second disk systems configured to receive data packets from the first disk system, to receive a limit time value from a predetermined one of the second disk systems based on time stamps and sequence numbers contained in the data packets, to select a candidate data packet from among its received data packets by comparing their associated time stamps to the limit time value, and to write the candidate data packet on one of its second disk units,
   wherein blocks of data written on the first storage component are written on the second storage component in the same order as on the first storage component.

2. The system of claim 1 wherein each of the second disk systems produces a candidate limit time, wherein the limit time value is the earliest time among the candidate limit times.

3. The system of claim 1 wherein the data network is a connectionless network.

4. The system of claim 1 wherein the data network is characterized as being unable to guarantee that data packets will be received in the same order as they were sent.

5. The system of claim 4 wherein the data network is a wide area network.

6. The system of claim 1 wherein each of the first disk units is associated with one of the second disk units.

7. The system of claim 6 wherein each first disk unit is associated with one of the second disk units independently of the second disk system to which the second disk unit belongs.

8. A method of operating a storage system that includes a local disk system and a remote disk system, comprising:
   receiving a block of data to be written to a first local disk unit among a plurality of local disk units in a local data store in the local disk system;
   sending a data packet to a first remote disk unit among a plurality of remote disk units in a first remote data store from among a plurality of remote data stores in the remote disk system, the data packet including the block of data, a time stamp, and a sequence number, wherein the first local disk unit and the first remote disk unit defines a remote copy pair;
   in the first remote data store, performing steps of:
      receiving from a predetermined remote data store a limit time, the limit time being determined based on the sequence numbers and the time stamps of its data packets; and
      selecting a data packet whose block of data is to be written on a remote data store by comparing the time stamp of each of its data packets against the limit time.

9. The method of claim 8 further including incrementing the sequence number for a next data packet.

10. The method of claim 8 further including writing plural blocks of data to the local disk units and sending plural data packets to the remote disk units so that each remote disk unit has a list of sequence numbers from its associated plural data packets, the method further including, for each list of sequence numbers, obtaining a longest run of sequence numbers, obtaining the highest-valued sequence number from the longest run, and obtaining the time stamp corresponding to the highest-valued sequence number, thereby producing a list of time stamps, the method further including selecting a data packet based on the earliest time stamp in the list of time stamps.

11. The method of claim 8 wherein each of the local disk units is associated with one of the remote disk units independently of the local disk system to which the local disk unit belongs.

12. The method of claim 8 wherein receiving a block of data at the local disk system data store and sending a data packet to the remote disk system are performed asynchronously.

13. The method of claim 8 wherein the data packets are sent over a connectionless data network.

14. The method of claim 8 wherein the data packets are sent over a data network that is characterized as being unable to guarantee that data packets will arrive at a destination in the same order as they were sent.

15. The method of claim 14 wherein the data network is a wide area network.

16. In a local storage system comprising a local data stores, a method for backing up data in the local storage system to a remote storage system comprising plural remote data stores, the method comprising:

at the local data store, receiving a data block to be written thereto;

at the local data store transmitting a data packet comprising the data block, a time stamp, and a sequence number to one of the remote data stores;

at the remote data stores, receiving plural data packets from the local data stores, wherein each remote data store has its associated plural data packets and a list of sequence numbers and a list of time stamps from the associated data packets;

at each remote data store, identifying a longest run of sequence numbers and an obtained data packet having the highest-valued sequence number of the longest run of sequence numbers;

at a predetermined remote data store, identifying a limit time from among time stamps associated with obtained data packets from the remote data stores;

at each remote data store, selecting a candidate data packet having the earliest time stamp; and identifying a selected data packet from among the candidate data packets whose time stamp is earlier than the limit time and writing the selected data packet to one of the remote data stores.

17. The method of claim 16 wherein the local data store plurality of local disk drives and each remote data store a plurality of remote disk drives, each local disk drive being associated with one of the remote disk drives to define a remote copy pair, wherein there is a sequence number associated with each remote copy pair.

18. The method of claim 17 wherein the received plural data packets are grouped according to remote copy pair.

19. The method of claim 18 wherein each of the plural data packets is grouped based on the local disk drive from which it was sent.

20. The method of claim 17 wherein each remote copy pair is associated with one of a plurality of data integrity pair groups, wherein a sequence number is associated with each pair of local and remote disk drives which have a common data integrity pair group.

\* \* \* \* \*